Aug. 24, 1954

E. W. MERRILL 2,687,446

BATTERY SEPARATOR

Filed April 25, 1951

*Inventor*
*Edward Wilson Merrill*
By Theodore C. Browne
*Attorney*

Patented Aug. 24, 1954

2,687,446

UNITED STATES PATENT OFFICE 2,687,446

BATTERY SEPARATOR

Edward Wilson Merrill, Cambridge, Mass., assignor to Dewey and Almy Chemical Company, North Cambridge, Mass., a corporation of Massachusetts Application April 25, 1951, Serial No. 222,921

5 Claims. (Cl. 136—145)

This invention relates to battery separators and is concerned with an improvement in separators formed from cellulosic webs which have been impregnated with an acid resistant resin. This application is a continuation-in-part of my copending application entitled "Improvements in Battery Separators," filed April 11, 1950, Ser. No. 155,294, which discloses one form of such separators.

In the application referred to above, I disclosed a battery separator formed essentially from a cellulose web, although glass fibers and small amounts of African blue asbestos might be added to increase its strength. The webs were impregnated with an acid resistant resin of the thermosetting type. The ribs of the separator were formed by passing the web between a pair of heated forming rolls. Subsequently, the resin in the separator was cured by heating the web in an oven. That process produced separators which had good performance and which were dimensionally stable. Also, ribs formed by the process were strong and held their dimensions in a very satisfactory manner.

However, it was found, that, when the fibrous web had been impregnated with an acid resistant resin solution and then squeezed to retain the desired proportion of resin in the web, it was necessary to dry the web quite slowly and carefully. Otherwise, the resin, in drying, concentrated adjacent the surfaces of the web and migrated away from its interior portions. All other steps in the process could be carried out expeditiously, but the slow drying of the web subsequent to its impregnation with the resin solution caused a hold-up in what otherwise was a smooth flow of material through the various process steps and made it highly desirable to increase the speed of drying of the resin solution in the web without at the same time causing the concentration of resin at the surface of the web. One of the objects of this invention is to permit the drying of the resin wet web to occur so rapidly that high production rates may be maintained.

The function of a battery separator is to keep the positive and negative plates of a storage battery from coming into contact and so electrically short circuiting the cell. It must prevent any of the particles, either from the positive or the negative plates, from penetrating through the separator, but at the same time it must allow the free passage of the current-carrying ions in the battery solution. It follows that if the resistance to the passage of electric current which is interposed by the battery separator is not to be impossibly high, the separator must be a highly porous material, and separators made according to the process disclosed in my copending application, as well as several other types, are formed from lofty, low density, porous, fibrous webs. One particularly satisfactory cellulosic web, as an example, is composed of interlaced fibers crossing at random angles, spaced on an average of about 50 microns apart. Microscopical examination of the surface of such a web indicates that the minimum dimension between crossing fibers is approximately 12 microns. The maximum dimension between crossing fibers is approximately 150 microns, and the average between crossing fibers is 50 microns. It is evident that evaporation of a liquid from such a porous fibrous surface does not take place from a theoretically plane interface, but does take place throughout an area which encompasses some substantial depth of the pores adjacent to the actual surface.

I have discovered that if such a web is sufficiently thin, the liquid carrier of the resin may be evaporated at quite high drying rates without any substantial migration of the resin. The distribution of the resin in the dried sheet remains substantially uniform. The thickness of a porous sheet which permits such rapid drying without migration of the resin particles depends upon the size and distribution of the pores within that sheet. My tests have been confined to sheets which are porous enough to have a satisfactorily low electrical resistance when impregnated with sufficient resin to make them acid resistant, making them suitable for use as battery separators. Using such sheets, I have found that substantially no migration occurs when the moisture is removed from a single side by evaporation into bone dry air at a temperature as high as 210° F. where the sheet is from 0.009 inch to 0.010 inch thick. Thus if the drying conditions on both sides of the sheet are substantially uniform, the moisture may be removed from a sheet having a thickness as great as 0.018 inch to 0.020 inch without migration of the resin. If the sheet is thicker than this, migration of the resin from the center portion to the outside of the sheet occurs. Similarly if the drying rate on one side of the sheet is greater than that on the other, and the sheet is in excess of 0.009 inch to 0.010 inch thick, migration of the resin occurs from the side subjected to the lower drying rate to that subjected to the higher rate.

Accordingly, when making separators having a nominal web thickness greater than about 0.018 inch, I form such separators by adhesively joining superposed webs having a thickness less than 0.018 inch to give a separator having the desired thickness. Each of such superposed webs is impregnated with an acid resistant resin and each web has a substantially uniform distribution of resin throughout the thickness of the sheet.

In addition to securing rapid drying and expeditious manufacture, such a battery separator possesses numerous advantages, one of which is that the back ply may be formed as a plain sheet without ribs and the front ply only may be the ribbed element of the separator. When the back of a separator, which always is placed against the negative plate, is a plain surface, it more effectively prevents material detached from the negative plate from surging up and down and grinding out the separator. Any thin, lofty, porous, low density web which when impregnated with an acid resistant resin gives a sufficiently low electrical resistance may be used. I use webs made according to my copending application Serial No. 155,294, or, as my preferred form, webs made according to the specification of my application for patent filed simultaneously with this application.

My preferred method of ribbing the front ply is fully disclosed in application Serial No. 155,294. Providing a rear wall for the upthrust rib and, in effect, making the ribs into tubes stiffens the ribs and the separator so much that, for ordinary automotive service, no extra resin need be applied to the rib nor is other reinforcement necessary. For heavy duty batteries a rib reinforcement is desirable. Additionally, there is a negligible chance that a pinhole in one ply will overlie a pinhole in the other ply.

Referring to the figures.

I shall use the manufacture of separators for passenger car starting batteries as an illustrative example. Since such separators normally have a normal web thickness of 0.030 inch, I prefer to form the separator from two superposed webs each having a thickness of 0.015 inch. These webs are impregnated with resin and calendered to squeeze out the excess solution in the manner described in my application Serial No. 155,294. I prefer to use water solutions of resin because of lower cost and easier handling conditions although solutions of resins in solvents such as alcohol are equally satisfactory.

I remove the water from the webs in a tunnel drier using bone dry air at a temperature of 200° F. and a velocity of 50 feet per minute. The time for drying takes from 3 to 3½ minutes. The drier is so constructed that both sides of the sheet are subjected to equal drying conditions. Under these conditions no migration of the resin takes place. It is understood, of course, that the temperature, humidity and velocity of the air may be varied at will to give an equivalent rate of drying and that the rate of drying may be reduced if the resulting increase in the time of drying is not a disadvantage. An increase in the rate of drying causes migration of the resin. The temperature of the air must be maintained at a value less than that at which the resin will cure, and the drying rate on both sides of the web must be maintained substantially equal.

Figure 1:
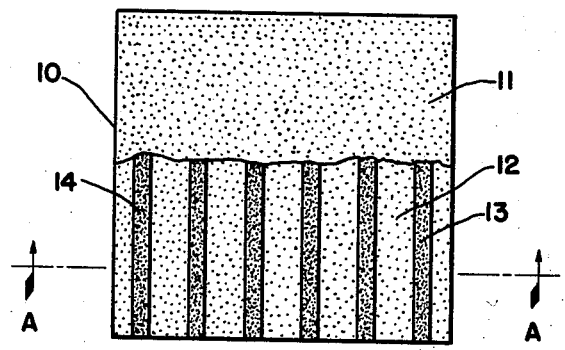
Figure 1 is a top plan view of the separator with a portion of the ribbed ply broken away to show the back ply.
Figure 2:
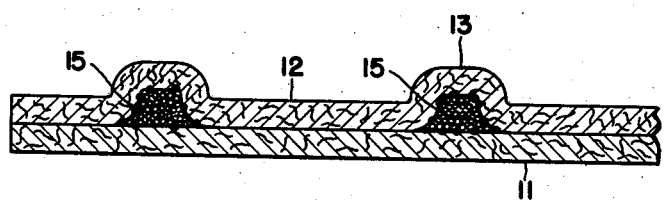
Figure 2 is a cross section of one form of separator on the line A—A of Figure 1.

Immediately after drying, the back ply 11 of the separator 10 passes into a curing oven maintained at a temperature of about 375° to 395° F. The duration of the exposure to heat in this oven is sufficient to cause the resin in the web to be completely cured to the C or the infusible stage. The front ply 12 is ribbed according to the disclosure of my copending application 155,294 to form the upthrust ribs 13 and if separators for heavy duty batteries are to be made, all of the steps in the ribbing and manufacture of the separator described in that application can be carried out. Batteries for passenger cars do not require the extra amount of resin placed on the ribs, and for all light and medium duty service this operation may be omitted. The separators are assembled by placing the ribbed ply 12 face downwardly with the rib hollows facing upwardly on the work table of an assembly stage. If the assembly is performed by hand, comminuted bits of an acid resistant thermoplastic resin, polystyrene, for example, are poured onto the ply and the thermoplastic particles are brushed into the rib hollows, filling them, as indicated at 15 in Figure 2. The cured back ply 11 is then laid over the front ply and the sandwich is lightly secured between two heated platens. The platen which contacts with the ribs is maintained at about 450° F., while the platen which comes in contact with the back ply is operated at a temperature of about 550° F. The time of contact may vary, depending upon the specific nature of the thermoplastic resin bits which are used to fill the rib hollows: it usually is between 30 and 60 seconds, and a pressure of about ¾ lb. per square inch is used. Under heat and pressure, the resinous bits sinter together and the outer particles penetrate the adjacent area of both webs adhesively securing the webs together. The assembly is then removed and placed between two cooling plates until the temperature of the separator is below the melting point of the resin which, in the case of polystyrene is about 160° F.

Figure 3:
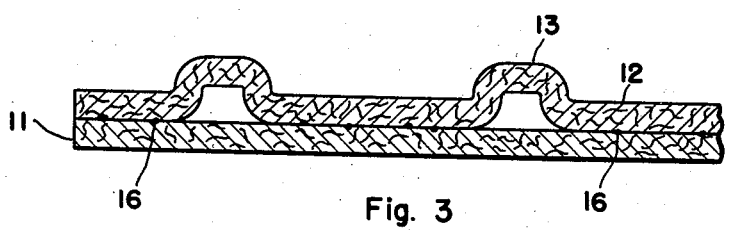
Figure 3 is a cross section of another form of separator also taken on the line A—A of Figure 1.

Alternatively, in the manufacture of separators designed for lighter duty conditions, the back ply 11 is laid on the assembly table and a very light scattering of resinous bits is shaken onto the back ply. The ribbed front ply 12 is superposed and the sandwich is placed between heated platens under conditions which have been previously described. In this instance the scattered bits of resin fuse and form small adhesive spots which secure the two plies together. These fused bits which adhesively join the webs together are indicated by the black dots 6—6 of Figure 3.

Beads of polystyrene are particularly recommended as the rib filling and scattered adhesive material. They can be moved very easily by a brushing or squeegeeing operation and have almost no tendency to pack in feed pipes or spouts when an automatic assembly method is used.

This process makes it possible to produce battery separators in a rapid and relatively inexpensive manner. Additionally, strong separators may be made for heavy duty service, or thick separators may be made by combining a number of plies without much complication in the factory procedure.

I claim:

1. A storage battery plate separator comprising a plurality of plies of a high porosity, water-laid felt, the fibers of which are protected by a substantially uniformly distributed coating of an acid resistant, thermosetting resin reacted to its infusible stage, the back ply being a plain sheet, the front ply bearing transverse upthrust portions forming ribs extending across the separator, the hollow portions of the ribs being filled with sintered grains of an acid resistant, thermoplastic resin which form a reinforcement for the ribs and adhesively secure the plies together.

2. A storage battery plate separator comprising a plurality of plies of a porous water-laid felt, the fibers of which are protected by a substantially uniformly distributed coating of an acid resistant, thermosetting resin reacted to its infusible stage, one of said plies bearing transverse upthrust portions forming ribs extending across the separator, the plies of said separator being adhesively united by randomly scattered fused grains of a thermoplastic resin.

3. The method of rapid-drying of resin impregnated, low density, porous, fibrous webs of not over .020 inch in thickness suitable for use in storage battery separators, and of securing a substantially uniform distribution of resin therein which includes impregnating the web with a solution of an acid resistant thermosetting resin, expressing the excess resin solution by squeezing the web to retain from 10 to 35% dry weight of resin in the web, and then drying the web by subjecting both sides simultaneously to substantially identical drying conditions equivalent to drying in bone dry air at a temperature of 200° F. at an air velocity of 50 feet per minute.

4. The method of reinforcing upthrust ribs of a multi-ply storage battery separator of the class described and of bonding the plies together which includes filling the rib hollows of the ribbed ply with grains of a thermoplastic resin, placing an unribbed back ply over the filled ply and subjecting the sandwich to heat and pressure to sinter the grains together and adhesively join the plies.

5. The method of adhesively securing the plies of a multi-ply storage battery separator of the class described which includes scattering grains of a thermoplastic resin on the surface of one ply, superposing another ply and subjecting the sandwich to heat and pressure to adhesively join the plies.

References Cited in the file of this patent

UNITED STATES PATENTS

| Number | Name | Date |
|---|---|---|
| 533,751 | Salom | Feb. 5, 1895 |
| 1,295,660 | Willard | Feb. 25, 1919 |
| 1,432,938 | Wood et al. | Oct. 24, 1922 |
| 1,463,864 | Bent | Aug. 7, 1923 |
| 1,890,178 | Heise et al. | Dec. 6, 1932 |
| 1,898,601 | Shoemaker | Feb. 21, 1933 |
| 2,004,304 | Wells | June 11, 1935 |
| 2,117,371 | Slayter | May 17, 1938 |
| 2,120,120 | Wells | June 7, 1938 |
| 2,121,872 | Hazell et al. | June 28, 1938 |
| 2,345,541 | Scholze Jr. | Mar. 28, 1944 |
| 2,438,366 | Illingworth | Mar. 23, 1948 |
| 2,484,787 | Grant | Oct. 11, 1949 |
| 2,512,128 | Albright | June 20, 1950 |
| 2,531,504 | Dillehay et al. | Nov. 28, 1950 |

FOREIGN PATENTS

| Number | Country | Date |
|---|---|---|
| 781,656 | France | May 20, 1935 |
| 845,427 | France | Aug. 23, 1939 |
| 617,728 | Great Britain | Feb. 10, 1949 |